United States Patent Office 3,160,653
Patented Dec. 8, 1964

3,160,653
METHOD OF PRODUCING BENZENE RING-HAL-
OGENATED AROMATIC HYDROCARBONS
Anton Benning, Essen-Heisingen, and Kurt Handrick,
Essen-Steele, Germany, assignors to Bergwerksverband
G.m.b.H., Essen, Germany
No Drawing. Filed Aug. 18, 1960, Ser. No. 50,313
Claims priority, application Germany Aug. 22, 1959
6 Claims. (Cl. 260—465)

The present invention relates to the production of benzene ring-halogenated aromatic hydrocarbons, and more particularly to a method of directly halogenating the benzene nucleus of an aromatic hydrocarbon which is adapted to be halogenated, that is with at least one free, unsubstituted position in the benzene ring.

Halogenated hydrocarbons of course have many important industrial and technical uses which make these compounds extremely valuable, and which therefore make the possibility of producing such compounds in quantity and in an easily controllable, inexpensive manner extremely desirable.

Halogenated aromatic hydrocarbons are particularly valuable as starting materials for many purposes, such as for the production of dyes, synthetic resins and insecticides. The functional halogen group of such compounds may be varied in many respects in order to give the obtained products a higher degree of color, a higher degree of flame-proofing, or even toxicity. The production of such nuclear halogenated aromatic carboxylic acids is particularly difficult.

Halogenated aromatic carboxylic acids are generally produced by converting the corresponding polyalkyl aromatic compound or alkyl carboxylic acid with elementary halogen according to the known nuclear halogenation methods, and in the case of halogenation of a polyalkyl aromatic compound, by subsequently oxidizing one of the alkyl groups.

A direct halogenation is often difficult or impossible since the blocking carboxylic group makes it difficult, or completely prevents the introduction of the halogen, depending on the number and position. Where it is possible to directly halogenate, an often undesired polyhalogenation takes place. Thus, for example, in the production of monochloroterephthalic acid, p-xylene or p-toluic acid, preferably dissolved in a solvent, are chlorinated with chlorine gas and the monohalogenation product isolated from the reaction mixture is subsequently oxidized. The direct chlorination of terephthalic acid, which must be carried out in fuming sulfuric acid (note German Patent No. 1,078,563) only results in the production of the tetrachloroterephthalic acid.

Aside from the fact that halogenation with elementary halogen usually results in a large loss of solvents, requires carefully controlled conditions, and thorough purification of the final product, one half of the utilized halogen is converted to the corresponding hydrogen halide compound and is thus lost for the halogenation.

It is accordingly a primary object of the present invention to provide a general method of halogenating the benzene ring of aromatic hydrocarbons, which method is applicable to the halogenation of all aromatic hydrocarbons the benzene ring of which is adapted to be halogenated, i.e., which contains at least one free, unsubstituted position in the benzene ring.

It is another object of the present invention to provide a method of producing benzene ring-halogenated aromatic hydrocarbons which method is particularly applicable to the nuclear halogenation of alkyl aromatic carboxylic acids and which method results in a direct halogenation of the benzene ring despite the presence of one or more carboxyl groups or one or more alkyl groups, or the like.

Other objects and advantages of the present invention will be apparent from a further reading of the specification and of the appended claims.

With the above and other objects in view, the present invention mainly comprises the production of benzene ring-halogenated aromatic hydrocarbons comprising the reacting of an aromatic hydrocarbon the benzene ring of which is adapted to be halogenated with nitric acid of a concentration of up to 40% and with a halogen donator selected from the group consisting of hydrohalic acids and metal halides. Thus, the reaction can be carried out with a hydrohalic acid such as hydrochloric acid or hydrobromic acid or with a metal halide, preferably an alkali metal or alkaline earth metal halide such as sodium chloride, or with both a hydrohalic acid and a metal halide. The reaction is most preferably carried out at about the boiling temperature of the reaction medium.

It has surprisingly been found that a nuclear halogenation of aromatic hydrocarbons in general, and even of aromatic alkyl carboxylic acids is possible in a direct and simple manner, with no loss of the halogen, by reacting the aromatic hydrocarbon the benzene ring of which is adapted to be halogenated, i.e., which contains at least one free, unsubstituted position in the benzene ring, for example an alkyl carboxylic acid, with nitric acid of a concentration of up to but not greater than 40% and with a hydrohalic acid and/or a metal halide such as an alkali metal halide, the reaction preferably being carried out under refluxing at boiling temperature. It should be noted that it is essential in carrying out this reaction to use the hydrohalic acid and not the hydrogen halide itself. Thus, the reaction will not properly take place with the gaseous HCl, HBr, or the like, but only with the corresponding acid, i.e., hydrochloric acid, hydrobromic acid, etc.

The reaction of the present invention is applicable to aromatic hydrocarbons in general, including the previously difficult to halogenate aromatic alkyl carboxylic acids as well as aromatic compounds containing instead of a carboxylic acid group a group which is convertible to a carboxyl group by reaction with an acid such as nitric acid. The reaction is even applicable to the nuclear halogenation of polyalkyl aromatic hydrocarbons such as durene.

The mixture which is used for the reaction of the present invention, that is the mixture of the nitric acid of concentration up to 40% and the hydrohalic acid and/or metal halide does not give off any free halogen upon heating at boiling temperature. If the nitric acid is first added to an aromatic hydrocarbon to be halongated, it is not until the addition of the halogenating agent, that is the hydrohalic acid or the metal halide that a strong disengagement of nitrous oxides is observed, this indicating the beginning and continuation of the nuclear halogenation. Furthermore, and most remarkably, in the process of the present invention the waste gas consists mainly of nitrogen oxides and is practically free of volatile halogen compounds. The reaction according to the present invention is practically quantitative.

By carrying out the process of the present invention with nitric acid of not more than 40% concentration the concentration of the nitric acid is not sufficiently high for the oxidation of any alkyl groups or for the introduction of any nitro groups into the compound, the nitric acid merely acting to dehydrogenate the hydrohalic acid which is present in the mixture. It is apparent that if a metal halide is used instead of a hydrohalic acid a greater amount of nitric acid is needed for the reaction than in the case of the use of the hydrohalic acid.

As indicated above, the method of the present invention although applicable in general to all aromatic hydrocarbons the benzene ring of which is adapted to be halogenated, is of particular value in the case of the nuclear halogenation of alkyl carboxylic acids, that is aromatic hydrocarbons containing at least one alkyl group and at least one carboxyl group linked to the benzene ring. With such starting material it is possible to obtain exceedingly valuable nuclear halogenated alkyl carboxylic acids in high yield and high degree of purity in a simple manner.

Instead of starting with an alkyl carboxylic acid, that is a compound containing an alkyl group and a carboxyl group, it is possible instead to carry out the reaction with an aromatic hydrocarbon containing at least one alkyl group and at least one group which upon reaction with an acid, for example with the nitric acid, is adapted to be converted to a carboxyl group, for example by saponification or oxidation. Such groups would for example be a carboxylic acid ester group, a carboxylic acid chloride group or a cyanide group, as well as an aldehyde group, an oxymethyl group or a chloromethyl group.

Among the aromatic compounds which may be nuclear halogenated in accordance with the present invention are alkyl benzoic acids, dialkyl benzoic acids, trialkyl benzoic acids, tetraalkyl benzoic acids, dialkyl phthalic acids, trialkyl phthalic acids, naphthoic acid, alkyl naphthoic acids, polyalkyl naphthoic acids, naphthalene dicarboxylic acids, alkyl-naphthalene dicarboxylic acids, polyalkyl-naphthalene dicarboxylic acids, anthaquinone carboxylic acids, alkyl-anthraquinone carboxylic acids, polyalkyl-anthraquinone carboxylic acids, phenanthrene carboxylic acids, alkyl-phenanthrene carboxylic acids, polyalkyl-phenanthrene carboxylic acids, tetraalkyl benzene and pentaalkyl benzene. In all of the above compounds the alkyl group is preferably a lower alkyl, most preferably of up to 7 carbon atoms, for example a methyl, ethyl, propyl, isopropyl, cyclohexyl or the like group.

The carboxyl groups contained in the above mentioned compounds may be replaced by the following groups: —COOalk wherein alk is an alkyl, —COCl, —CONH$_2$, —CN, —CHO, —CH$_2$OH, —CH$_2$Cl, —CHCl$_2$, and —CCl$_3$; the alkyl groups may be replaced by C$_6$H$_5$—, C$_{10}$H$_7$—, etc., C$_6$H$_5$CH$_2$—, Cl—, Br—, I—, F—, —Oalk, or ortho-condensed aromatic ring systems.

As has been recognized in particular, a piling up of o/p-directors (e.g., alkyl groups) favors the nuclear halogenation, whereas m-directors (e.g. carboxylic acid groups with increasing number, 2 or 3 respectively) render it difficult. Where two substituents of different kind act together, an optimum nuclear chlorination is achieved.

The position of entrance of the halogen is determined by the directing influence of the substituents present. Consequently, the compound 3-chloro-4-methyl-benzoic acid, e.g., results from the toluic acid and its further oxidation, as it is known, yields chloroterephthalic acid. The chlorine is thus substituted in o-position to the methyl group and in m-position to the carboxyl group. If the substituents present act upon several positions of the aromatic nucleus, a mixture of isomers is often formed, since generally only a monohalogenation takes place.

In carrying out the process of the present invention under technical conditions, the starting material is heated until boiling together with a hydrohalic acid and/or a metal halide, and the nitric acid, preferably under agitation and under refluxing. The reaction is generally completed at most after two hours.

At least 1 mol of HNO$_3$, preferably 5 to 10 mols of HNO$_3$, are reacted per mol of the starting aroatic hydrocarbon. Although greater amounts of nitric acid are possible for known technical reasons such greater amounts are undesired.

The concentration of the nitric acid is, as mentioned above, at most 40%. Preferably nitric acid of a concentration of 10–40% is used. The use of 20–35% nitric acid is particularly advantageous. In case metal halides are used as halogen donors and/or an oxidation is to take place simultaneously, the nitric acid which is used is preferably in the upper concentration range.

If the halogen is added to the reaction mixture as a hydrohalic acid, e.g., hydrochloric acid, it is desirable to add an acid of a concentration as high as possible, in order to avoid an unnecessary increase in the volume of the reaction mixture and an automatic dilution of the nitric acid.

The reaction may be carried out with hydrohalic acid of any concentration; hydrohalic acids of 5–36% concentration are particularly suitable for the process of the present invention.

With a single nuclear halogenation at least the stoichiometric amount of hydrohalic acid and/or metal halide salt is used for each mol of the starting material, with double nuclear halogenation requiring the respectively doubled amount. A mixture consisting of starting material, nitric acid, and halogen donor is preferably used, being heated to boiling until the end of the reaction. The halogen donor may, instead, be added at a later stage, especially if an oxidation-reaction is to precede.

The nuclear halogenation is, in general, as mentioned above, terminated at the latest after two hours. If the reaction is favored by substituents, the halogenation may be complete after only 30 minutes. In case an oxidation takes place simultaneously, 3 to 10 hours are generally necessary for the entire course of the reaction. The reaction period is normally about 40–120 minutes.

The reaction mixture is suitably heated to boiling under reflux and intensive agitation. The temperature for the course of the reaction is as a practical matter in the range of 90 to 120° C.

It is not necessary for the success of the halogenation reaction that the starting aromatic substance be liquid at the reaction temperature (about 108° C.). The substance takes up the halogen while still in solid condition.

Beside its simplicity, the process of the present invention is distinguished by high degree of economy, since only cheap chemicals, such as, e.g., hydrochloric acid or common salt, i.e., sodium chloride and nitric acid are used in technical qualities. It is even possible to employ the acid mother liquors, after reconcentration, for a new nuclear halogenation, as well as to reobtain, without difficulties, the waste gases containing nitrous oxides as nitric acid according to known procedures.

The following examples are given to further illustrate the present invention. The scope of the invention is not, however, meant to be limited to the specific details of the examples.

*Example I*

136 parts by weight of p-toluic acid, melting point 178° C., acid number 411, are heated to boiling (107° C.) under intensive agitation under reflux together with 1200 parts by weight of 30% nitric acid and 120 parts by weight of 36% hydrochloric acid. After cooling the product is filtered off, washed with water and dried. 163 parts by weight of chloro-p-toluic acid are obtained, the acid number being 330. The content of chlorine amounts to 20.5% which corresponds to a p-toluic acid having been chlorinated up to 98.5%. The oxidation of this product with diluted nitric acid under pressure at 180° C. results in chloroterephthalic acid.

*Example II*

136 parts by weight of o-toluic acid, melting point 104° C., acid number 410, are heated under intensive agitation together with 1500 parts by weight of 32% nitric acid and 100 parts by weight of common salt. After one hour the solution is cooled. The chloro-o-toluic acid is filtered off, washed and dried. Yield: 160 parts by weight, acid number 332, content of chlorine: 20.1%.

*Example III*

A mixture consisting of 136 parts by weight of o-toluic acid, 1100 parts by weight of 20% nitric acid and 150 parts by weight of sodium bromide is heated to boiling for one hour, cooled, and the crystals are separated and subsequently washed with water. 170 parts by weight of bromo-o-toluic acid of the acid number 268 and a bromide content of 31.3% are obtained.

Example IV 150 parts by weight of 2,4-dimethyl-benzoic acid are heated to boiling for about one hour under refluxing together with 1200 parts by weight of 30% nitric acid and 120 parts by weight of 36% hydrochloric acid. After cooling, the chlorinated organic acid is filtered off and washed with water. 175 parts by weight of chloro-2,4-dimethylbenzoic acid of a chlorine content of 19.1% are obtained. Upon oxidizing with dilute nitric acid under pressure at 180° C. chlorotrimellitic acid is obtained. When using the double amount of hydrochloric acid and longer heating periods (2–3 hours) the dichloro-2,4-dimethylbenzoic acid results which is converted to dichloro-tri-mellitic acid upon being oxidized under pressure with $HNO_3$.

Example V 208 parts by weight of 2,4,5-trimethyl-isophthalic acid are reacted together with 1200 parts by weight of 32% nitric acid and 150 parts by weight of calcium chloride-hexahydrate. 195 parts by weight of crude chloro-2,4,5-trimethyl-iso-phthalic acid containing 11.3% of chlorine are obtained.

Example VI 140.5 parts by weight of a mixture consisting of o- and p-chloromethyltoluene (containing about 45% of o-isomer and 55% of p-isomer) and having been obtained by chloromethylating toluene are heated at 60–80° C. under agitation and under refluxing together with 1500 parts by weight of 40% $HNO_3$, 100 parts by weight of common salt being added. When the formation of the toluic acid is terminated after 3 hours, the mixture is heated to the boiling point, the nuclear chlorination thus taking place. Yield: crude product 162 parts by weight, content of chlorine 18.9%.

Alpha-chloroethyl toluene, beta-chloroethyl toluene, dichloromethyl toluene and trichloromethyl toluene are each halogenated under the same conditions as this example.

Example VII 100 parts by weight of durene are heated to boiling for 80 minutes together with 1000 parts by weight of 20% nitric acid and 200 parts by weight of potassium bromide. After cooling the reaction mixture, the bromination product crystallized out is washed with water and purified by distillation. 49 parts of the monobromide of durene of the boiling point 154–156°/30 torr are obtained and 75 parts by weight of the dibromide of durene of the melting point 199° C. by re-crystallization of the distillation residue.

If instead of potassium bromide 120 parts by weight of common salt are added, dichloro-durene (melting point 189° C.) is obtained which can be converted to dichloropyromellitic acid by oxidation with dilute nitric acid under pressure at 180–190° C. in a $V_2A$-autoclave.

Pentamethyl benzene may be halogenated under the same conditions to give the corresponding chloro product.

Example VIII 172 parts by weight of alpha-naphthoic acid, acid number 326, are heated for about one hour under agitation and refluxed together with 150 parts by weight of concentrated hydrochloric acid and 2000 parts by weight of 30% nitric acid. The yield of washed crude product is 165 parts by weight with an acid number of 253 and a chlorine content of 21.6%.

Methylnaphthoic acid may be nuclear halogenated under the same conditions, and likewise, methylnaphthalene dicarboxylic acid may be nuclear halogenated under the same conditions. The naphthalene system can also be replaced by another aromatic system, as for example by a phenanthrene or an anthraquinone system.

Example IX 134 parts by weight of p-methyl-acetophenone are heated for about 90 minutes to the boiling point of the acid mixture together with 1500 parts by weight of 32% nitric acid and 120 parts by weight of 36% hydrochloric acid. 154 parts by weight of crude product with an acid number of 342 and a chlorine content of 13.0% are obtained.

Example X 150 parts by weight of p-toluic acid-methyl ester (melting point 35–36° C.) are heated to boiling under reflux conditions with 1500 parts by weight of 35% nitric acid and 120 parts by weight of sodium chloride for 5 hours. The yield of the crude chloro-p-toluic acid: 125 parts by weight (acid number 316, chlorine content 18.0%).

Example XI 122 parts by weight of a mixture of o- and p-methyl benzyl alcohol are heated under stirring and refluxing together with 100 parts by weight of sodium chloride and 1800 parts by weight of 32% nitric acid for about 4 hours. 150 parts by weight of a crude product with an acid number 324 are obtained. The chlorine content of the product is 19.5%.

Toluyl aldehyde may be nuclear halogenated under the same conditions.

Example XII 117 parts of weight of o-tolunitrile are heated to boiling for about 6 hours with 120 parts of concentrated hydrochloric acid and 1500 parts of 30% nitric acid. The yield of the chlorinated crude product amounts to 75 parts by weight (acid number 195, chlorine content 23.0%). 60 parts by weight of unreacted nitrile are re-obtained. In the place of the nitrile the acid amide may be reacted under the same reaction conditions.

Example XIII 198 parts by weight of p-phenyl-benzoic acid (acid number 282) together with 120 parts by weight of concentrated hydrochloric acid and 1500 parts of 32% nitric acid are heated under vigorous stirring for about 1½ hours at the boiling point (108° C.). The amount of the crude product obtained is 215 parts by weight, the acid number 252, the chlorine content 10.8%.

Other analogous aryl benzoic acids such as naphthyl benzoic acid may be nuclear halogenated under the same conditions.

Example XIV 156.5 parts by weight of o-chlorobenzoic acid (acid number 358, chlorine content 22.7%) together with 100 parts by weight of sodium chloride and 1200 parts by weight of approximately 35% nitric acid are heated to boiling for 3 hours. The washed and dried crude product (160 parts by weight) has an acid number of 330 and a chlorine content of 26.3%.

It is also possible to introduce other halogens into bromo-, iodo- or fluoro-carboxylic acids as well as into aromatic chloro-carboxylic acids in accordance with the above described process.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of chlorinating the benzene ring of an aromatic compound, which comprises reacting an aromatic compound selected from the group consisting of mono-loweralkyl benzoic acid, di-loweralkyl benzoic acid, tri-loweralkyl phthalic acid, chloro-loweralkyl toluene, tetra-loweralkyl benzene, naphthoic acid, loweralkyl naphthoic acid, loweralkyl naphthalene dicarboxylic acid, loweralkyl-acetophenone, mono-loweralkyl benzoic acid-loweralkyl ester, loweralkyl benzyl alcohol, tolunitrile, phenyl-benzoic acid and chlorobenzoic acid with a reaction mixture consisting essentially of nitric acid of about 10–40% concentration in an amount of at least one mol of nitric acid per each mol of said aromatic compound and an inorganic compound selected from the group consisting of hydrochloric acid, alkali metal chloride, and alkaline earth chloride at a temperature of about 90–120° C., thereby introducing the chlorine of said inorganic compound into the benzene ring of said aromatic compound.

2. Method of chlorinating the benzene ring of an aromatic compound, which comprises reacting an aromatic compound selected from the group consisting of mono-loweralkyl benzoic acid, di-loweralkyl benzoic acid, tri-loweralkyl phthalic acid, chloro-loweralkyl toluene, tetra-loweralkyl benzene, naphthoic acid, loweralkyl naphthoic acid, loweralkyl naphthalene dicarboxylic acid, loweralkyl-acetophenone, mono-loweralkyl benzoic acid-loweralkyl ester, loweralkyl benzyl alcohol, tolunitrile, phenyl-benzoic acid, and chlorobenzoic acid with a reaction mixture consisting essentially of nitric acid of about 10–40% concentration in an amount of at least one mol of nitric acid per each mol of said aromatic compound and an inorganic compound selected from the group consisting of hydrochloric acid, alkali metal chloride, and alkaline earth chloride at about the boiling temperature of the reaction medium, thereby introducing the chlorine of said inorganic compound into the benzene ring of said aromatic compound.

3. Method of chlorinating the benzene ring of an aromatic compound, which comprises reacting an aromatic compound selected from the group consisting of mono-loweralkyl benzoic acid, di-loweralkyl benzoic acid, tri-loweralkyl phthalic acid, chloro-loweralkyl toluene, tetra-loweralkyl benzene, naphthoic acid, loweralkyl naphthoic acid, loweralkyl naphthalene dicarboxylic acid, loweralkyl-acetophenone, mono-loweralkyl benzoic acid-loweralkyl ester, loweralkyl benzyl alcohol, tolunitrile, phenyl-benzoic acid, and chlorobenzoic acid with a reaction mixture consisting essentially of nitric acid of about 10–40% concentration in an amount of between about 5 and 10 mols of nitric acid per each mol of said aromatic compound and an inorganic compound selected from the group consisting of hydrochloric acid, alkali metal chloride, and alkaline earth chloride at a temperature of about 90–120° C., thereby introducing the chlorine of said inorganic compound into the benzene ring of said aromatic compound.

4. Method of chlorinating the benzene ring of an aromatic compound, which comprises reacting an aromatic compound selected from the group consisting of mono-loweralkyl benzoic acid, di-loweralkyl benzoic acid, tri-loweralkyl phthalic acid, chloro-loweralkyl toluene, tetra-loweralkyl benzene, naphthoic acid, loweralkyl naphthoic acid, loweralkyl naphthalene dicarboxylic acid, loweralkyl-acetophenone, mono-loweralkyl benzoic acid-loweralkyl ester, loweralkyl benzyl alcohol, tolunitrile, phenyl-benzoic acid, and chlorobenzoic acid with a reaction mixture consisting essentially of nitric acid of about 10–40% concentration in an amount of at least one mol of nitric acid per each mol of said aromatic compound and an inorganic compound selected from the group consisting of hydrochloric acid, alkali metal chloride, and alkaline earth chloride in an amount of at least one molecule of said inorganic compound per each molecule of chlorine to be introduced into the benzene ring at a temperature of about 90–120° C., thereby introducing the chlorine of said inorganic compound into the benzene ring of said aromatic compound.

5. Method of chlorinating the benzene ring of an aromatic compound, which comprises reacting an aromatic compound selected from the group consisting of mono-loweralkyl benzoic acid, di-loweralkyl benzoic acid, tri-loweralkyl phthalic acid, chloro-loweralkyl toluene, tetra-loweralkyl benzene, naphthoic acid, loweralkyl naphthoic acid, loweralkyl naphthalene dicarboxylic acid, loweralkyl-acetophenone, mono-loweralkyl benzoic acid-loweralkyl ester, loweralkyl benzyl alcohol, tolunitrile, phenyl-benzoic acid, and chlorobenzoic acid with a reaction mixture consisting essentially of nitric acid of about 10–40% concentration in an amount of at least one mol of nitric acid per each mol of said aromatic compound and hydrochloric acid of about 5–36% concentration at a temperature of about 90–120° C. thereby introducing chlorine into the benzene ring of said aromatic compound.

6. Method of chlorinating the benzene ring of an aromatic compound, which comprises reacting an aromatic compound selected from the group consisting of mono-loweralkyl benzoic acid, di-loweralkyl benzoic acid, tri-loweralkyl phthalic acid, chloro-loweralkyl toluene, tetra-loweralkyl benzene, naphthoic acid, loweralkyl naphthoic acid, loweralkyl naphthalene dicarboxylic acid, loweralkyl-acetophenone, mono-loweralkyl benzoic acid-loweralkyl ester, loweralkyl benzyl alcohol, tolunitrile, phenyl-benzoic acid, and chlorobenzoic acid with a reaction mixture consisting essentially of nitric acid of about 10–40% concentration in an amount of at least one mol of nitric acid per each mol of said aromatic compound and sodium chloride at a temperature of about 90–120° C. thereby introducing chlorine into the benzene ring of said aromatic compound.

References Cited in the file of this patent
UNITED STATES PATENTS
2,535,131   Gubelmann _____ Dec. 26, 1950